United States Patent [19] [11] 4,022,107
Falk [45] May 10, 1977

[54] TUBULAR KEY CUTTING MACHINE
[75] Inventor: Morris Falk, Palm Springs, Calif.
[73] Assignee: Fort Lock Corporation, River Grove, Ill.
[22] Filed: Jan. 8, 1976
[21] Appl. No.: 647,332
[52] U.S. Cl. .................. 90/13.05; 90/18
[51] Int. Cl.² ............. B23C 1/16; B23C 1/00
[58] Field of Search ........... 90/13.05, 18; 76/110; 33/174 F; 29/76 C

[56] References Cited
UNITED STATES PATENTS

| | | | |
|---|---|---|---|
| 1,485,276 | 2/1924 | Kuebler | 90/18 |
| 3,418,882 | 12/1968 | Brand | 90/13.05 |
| 3,818,798 | 6/1974 | Kotov et al. | 90/13.05 |
| 3,919,920 | 11/1975 | Schlage | 90/13.05 |

Primary Examiner—Harrison L. Hinson
Attorney, Agent, or Firm—Leydig, Voit, Osann, Mayer & Holt, Ltd.

[57] ABSTRACT

A machine for making identical tubular keys from a sample includes a decoder having a gage means mounted on the base of the machine for measuring the axial length of a bite in the sample. The decoder serves to position a first stop means for engagement by the blank to be cut so that the bite cut in the blank by a cutter will be of the same axial length as the bite in the sample. For proper positioning of the stop means, the decoder includes a rotatable cam disk having opposite edges shaped as inverted mirror images of each other. With this shape, the disk may be turned on a support until one of the edges engages the gage means. Once so positioned, the opposite edge of the disk locates the stop means for engagement by the blank at an axial position for cutting the same length of bite in the blank as the length of the bite in the sample being measured by the gage means. A lever mechanism connected with a key-carrying chuck mounted on the base is operable to move the chuck relative to the cutter in both axial and radial directions so that the bite to be cut in the blank can be cut with a single stroke of a lever within the mechanism.

15 Claims, 12 Drawing Figures

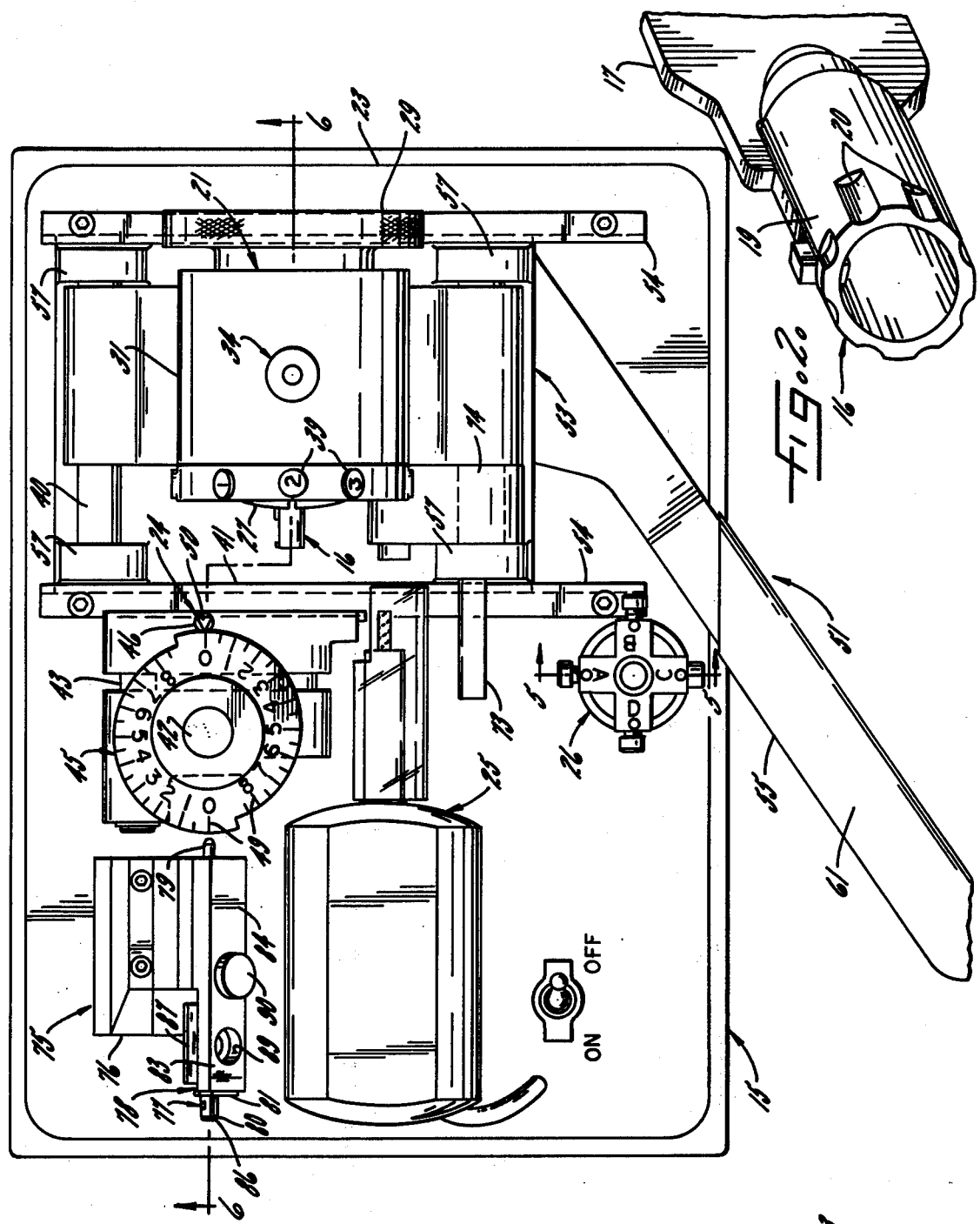
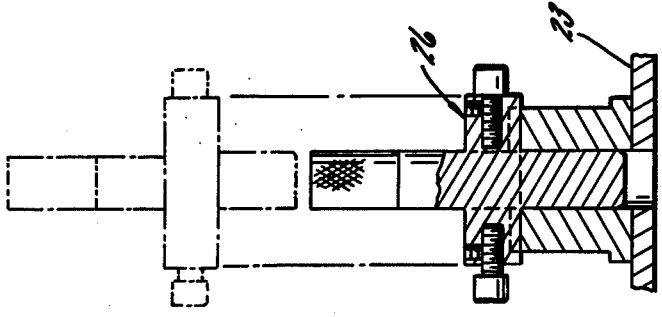

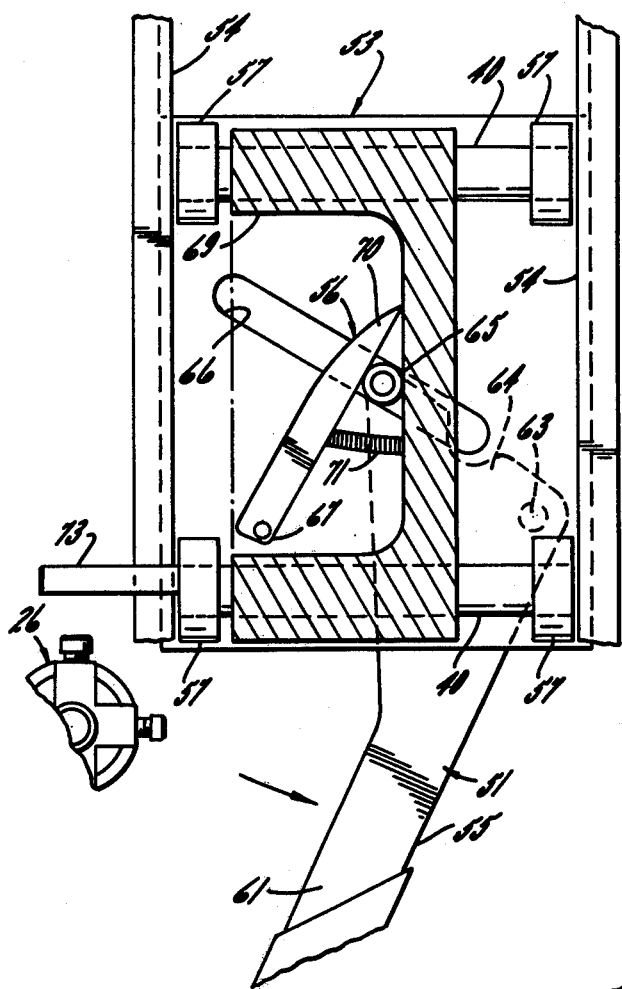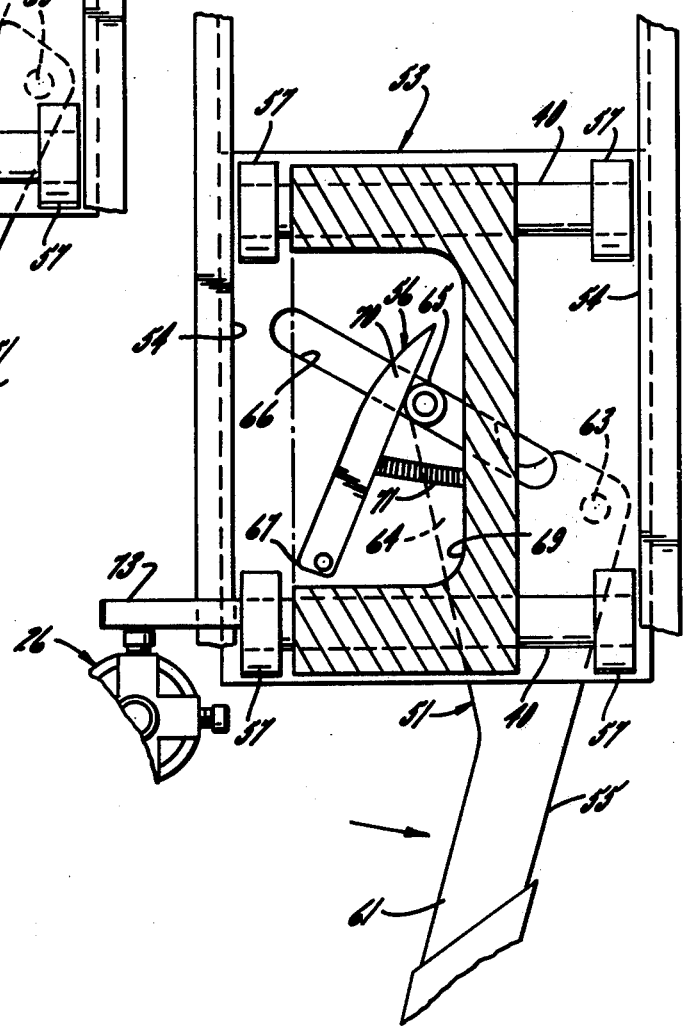

TUBULAR KEY CUTTING MACHINE

BACKGROUND OF THE INVENTION

The present invention relates to a key cutting machine particularly adapted for milling bites in the side of a tubular key blank to produce a tubular key. More particularly the present invention is concerned with the manner in which such tubular keys are reproduced according to coded settings of parts of the machine. In making a tubular key, each bite is milled in the blank at a preselected angular position around the key tube, the bite being cut in the tube to a preselected radial depth and to a specific axially directed length, all as determined by the coded positions of the various parts of the machine.

One machine of this general character is disclosed in Kotov et al. U.S. Pat. No. 3,818,798.

SUMMARY OF THE INVENTION

The primary object of the present invention is to provide an improved tubular key milling machine of the above general character with which duplicate keys may be produced from a code or by copying from a sample key whose code is deciphered while making the copy with the machine.

A more detailed object is to construct the machine so that, as an incident to decoding each key bite in the sample key, parts of the machine are located precisely for reproducing an identical bite in the key blank to be cut.

The invention also resides in the novel manner of decoding the sample key and in the provision of movable indicia which may be read and recorded as a code for future reference in producing copies of the sample key without need of the key itself.

Still further the invention resides in the novel construction of means for determining the code for the axial length of the bite in the sample key and, at the same time, positioning parts of the machine for milling a bite of the same depth in the blank key.

In addition, the invention resides in the unique construction of parts of the machine for moving the blank key into engagement with the cutter for cutting a bite to the precise axial length and radial depth required.

These and other objects and advantages of the present invention will become more apparent from the following detailed description when taken in conjunction with the accompanying drawings.

BRIEF DESCRIPTION OF THE DRAWINGS

FIG. 1 is a plan view of a tubular key milling machine embodying the novel features of the present invention.

FIG. 2 is a fragmentary perspective view of a typical tubular key having bites formed by operation of the exemplary machine.

FIG. 5 is an enlarged, fragmentary cross-sectional view taken substantially along line 5—5 of FIG. 1

FIG. 6 is a cross-sectional view taken substantially along line 6—6 of FIG. 1.

FIGS. 7 and 8 are fragmentary, cross-sectional views taken substantially along lines 7—7 and 8—8, respectively, of FIG. 6.

FIGS. 9 and 10 are fragmentary, cross-sectional views similar to FIG. 8 but showing parts of the machine in successive moved positions during operation of the machine.

FIG. 11 is an enlarged fragmentary, cross-sectional view taken substantially along line 11—11' of FIG. 6.

FIG. 12 is an enlarged fragmentary, cross-sectional view taken substantially along line 12—12 of FIG. 11.

DETAILED DESCRIPTION OF THE PREFERRED EMBODIMENT

Figure 3:
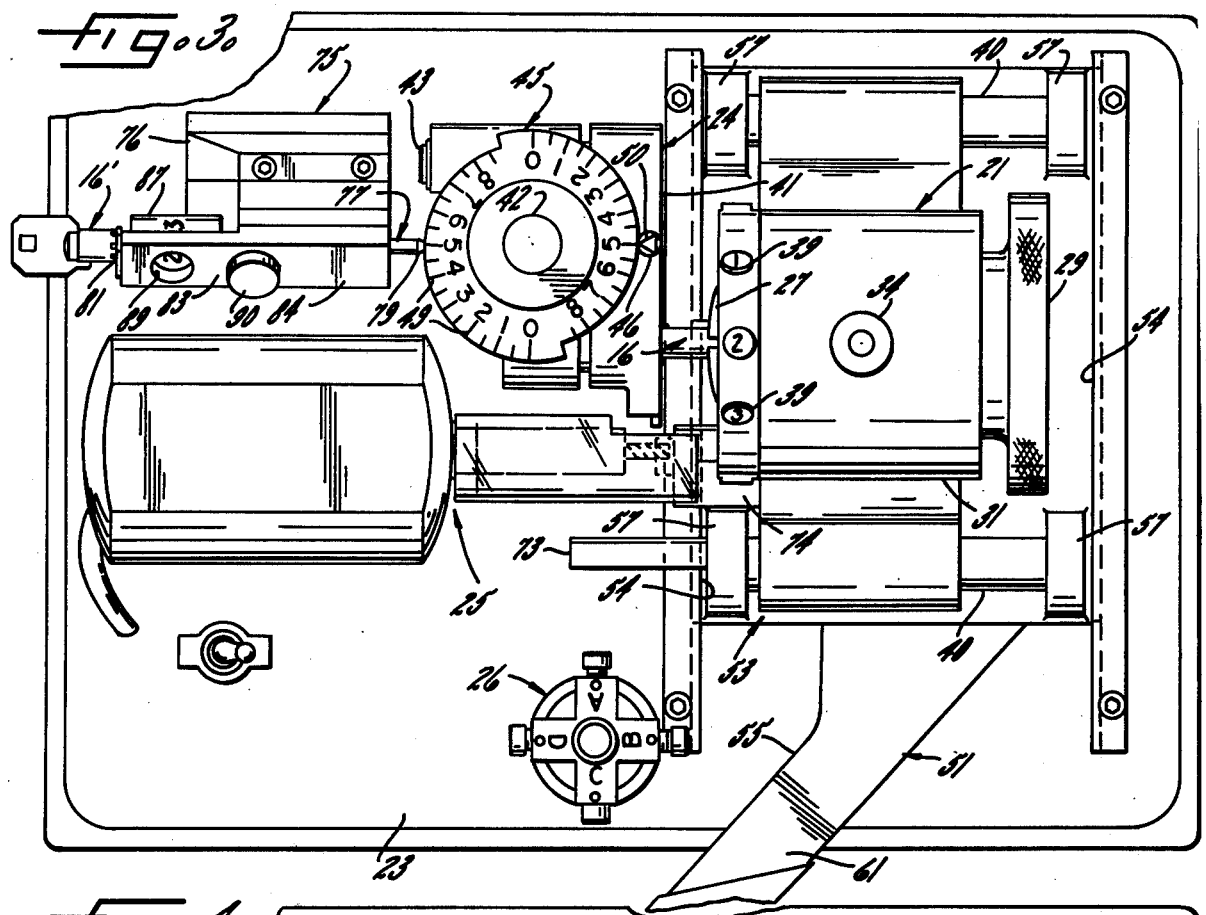
FIG. 3 is a fragmentary plan view similar to FIG. 1 but showing parts of the machine in moved positions preparatory to reproducing a second key from a sample.

While the invention will be described in connection with a preferred embodiment, it will be understood that it is not intended to limit the invention to that embodiment. On the contrary, it is intended to cover all alternatives, modifications and equivalents as may be included within the spirit and scope of the invention.

With reference to the drawings, there is shown in FIG. 1 an embodiment of the novel key cutting machine 15 of the present invention. In operation, the machine forms lock-operating indentations on a key 16, such as that shown in FIG. 2, which is provided with a head 17 and a key tube 19 of any standard diameter. In the context of the present invention, the indentations or bites 20 may be completely defined by describing the angular position of the bite upon the key tube, the axial length of the bite, and the radial depth of the bite.

To operate the machine 15, the key blank 16 is first mounted in a chuck 21 which is attached to a base 23. The key blank and chuck are then rotated into the desired angular position and, thereafter, are moved into a work position for milling one bite 20 in the key tube 19 (see FIG. 3). The axial location of this work position is determined by a first stop mechanism 24. To form the key bite on the key tube, the latter then is moved relative to a cutter means 25 which, herein, is secured to the base 23 adjacent the first stop mechanism. The chuck carries the key relatively toward the cutter means until a desired radial depth of the bite is reached. In the exemplary form of the invention, this desired depth is determined selectively by way of a web control or second stop means 26 which serves to limit the relative movement of the chuck toward the cutter. The radial depth of cut will vary with the different key sizes of various manufacturers. Consequently, the web control or stop 26 is provided with a plurality of arms (there here being shown four) each having an adjustment at its end. Each arm may thereby be set for a particular web dimension and the operator has a preset web dimension available for each arm of stop 26.

More specifically, to form a key 16 using the key cutting machine 15, the machine operator first mounts a key blank in the chuck 21. As shown in FIG. 6, the chuck is provided with a chuck nose 27 formed to receive and securely retain the key. Appropriate rotation of a hand wheel 29 threaded on the chuck nose draws the nose against a conical cam surface 30 formed within a chuck hosing 31. This motion of the chuck nose squeezes several key-grasping chuck fingers 33 together, thereby securely grasping and retaining the key within the chuck.

To locate the retained key blank 16 at a selected angular position, detent means 34 within the chuck 21 include a spring biased ball 35 urged toward a nose carrying collar 36 having a number of detent ball-receiving depressions 37 formed therein. For quick selection of a desired angular position, index numbers 39 (see FIG. 1) on the collar serve to designate the angular location of the chuck nose 27.

When the key blank 16 has been securely mounted in the chuck 21, the operator moves the chuck and retained key towards the cutter 25 along guide rails 40 (see FIG. 3) which are oriented axially with respect to the key tube 19. To stop the key blank 16 at a predesignated work position as it and the retaining chuck 21 are moved in the axial direction, the first stop mechanism 24 is mounted on the base 23 adjacent the cutter 25 and includes a key-engaging, adjustable block 41 shown in FIGS. 23 and 6. This block is mounted on a shaft 43 carried in a fixed bearing support 44 to allow the block to move in a direction prarallel to the axis of the mounted key. Axial positioning of the block 41 is achieved by way of a rotatable cam disk 45 which is fixed to a shaft 42 journaled on top of the bearing support 44. The disk engages an upwardly extending projection 46 (see FIG. 6) on the block so that, when the disk is rotated in one direction, the block is advanced in an axial direction relative to the cutter. When rotated in the other direction, the block is retracted. To hold the projection against the disk and thereby assure that the block is located precisely as desired, a spring 47 is telescoped over the block-carrying shaft 43 and acts between the shaft and the bearing support to urge the projection against the edge of the disk.

In order for the operator of the cutting machine 15 to quickly identify the rotational setting of the cam disk 45 for positioning the block 41 at the desired axial depth of the key bite to be cut, a series of indices 49 (see FIG. 3) are provided in the top surface of the disk. In use, the disk is rotated until the index corresponding to the desired setting is aligned with a pointer 50 on the projection 46.

Once the cam disk 45 and block 41 are positioned for cutting a bite 20 in the key tube 19, the chuck 21 is advanced toward the block until the outer end of the key blank 16 engages the block thereby positioning the key blank for the bite to be cut to the desired axial length. In accordance with one important aspect of the present invention, operation of the key cutting machine 15 is greatly simplified by constructing the machine so that, with a single motion on the part of the operator, the key blank 16 may be moved both axially and radially into engagement with the cutter 25 for cutting the bit 20 in a precisely located position in the key tube 19. For this purpose the guide rods 40 are mounted on a carrier 53 which is slidable within ways 54 to move in a generally radial direction relative to the cutter 25 and a unique lever mechanism 51 is connected by way of suitable connecting means to both the carrier and the chuck so that, with a single stroke in moving the lever mechanism from an inoperative position to an operative position, the chuck is moved in a forward, generally axial direction toward the first stop means 24 and then along such stop means and toward the cutter once the key blank is blocked against further forward movement.

In the present instance, the carrier 53 of the exemplary key cutting machine 15 is in the form of a generally rectangular plate (see FIGS. 6 and 8) having four upstanding bosses 57 mounted thereon adjacent the corners of the plate to support the guide rods 40 above the upper surface of the plate. The ways 54 support the forward and rearward side margins 59 and 60 of the plate above the upper surface of the base 23 for the plate to slide in a generally radial direction with respect to the cutter 25.

To move the plate within the ways, the lever mechanism 51 includes a lever 55 having a long leg or handle 61 extending outwardly from a pivotal connection 63 beneath the plate to the base. A short leg 64 of the lever extends from the pivot within the space between the plate and the base. Projecting upwardly from the free end of the short leg is a follower 65 which telescopes into an elongated guide way or slot 66 formed through the plate. Herein, the slot extends in a generally diagonal direction partially across the plate from adjacent the rearward edge 60 of the plate and toward the forward edge 59 so that, upon moving from the rearward end of the slot toward the forward end, the slot is slanted away from the axis of the cutter 25. With this construction, as the lever 55 is pivoted in a counterclockwise direction (see FIG. 8) from its inoperative position with the follower 65 located adjacent the rearward end of the slot, the follower rides forwardly within the slot thereby pulling the carrier 53 along the ways 54 in a generally radial direction relative to the cutter.

Figure 4:
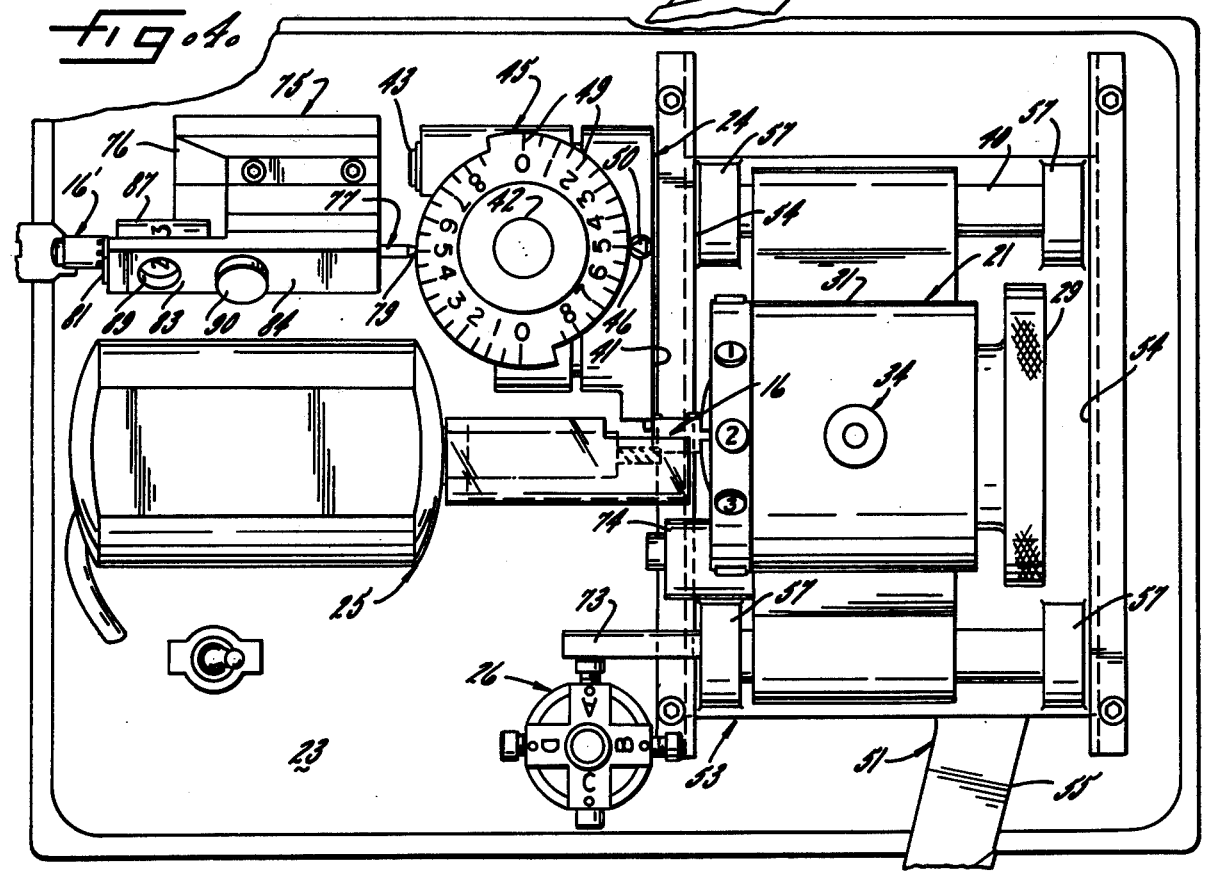
FIG. 4 is a fragmentary plan view similar to FIG. 3 but showing parts of the machine in further moved positions for cutting a bite in a key blank in producing the second key.

To move the chuck 21 forwardly in a generally axial direction toward the first stop mechanism 24 as the lever 55 is pivoted counterclockwise the means connecting the lever mechanism 51 with the chuck includes means yieldably holding the chuck for movement with the follower 65. Accordingly, the axial component of movement of the follower in the slot 66 is transmitted to the chuck so it slides along the guide rods 40 in an axial direction toward the first stop mechanism. Herein, such yieldable holding means is in the form of an elongated arm 56 with one end 67 pivotally pinned to the underside of the chuck housing 31 within a generally rectangular recess 69 formed within the housing between the guide rods. The other end portion 70 of the arm engages the follower 65 on the forward side thereof and a spring 71 connected between the arm and the chuck housing urges the arm rearwardly into engagement with the follower, captivating the follower yieldably between the arm and the housing. Accordingly, as the lever is pivoted counterclockwise, the chuck housing is held to slide forwardly along the guide rods 40 as the follower rides within the slot. When the key blank 16 held within the check engages the positioned block 41 (see FIGS. 3 and 9) of the stop mechanism 24, further axial movement of the chuck 21 is prevented. As a result, continued counterclockwise movement of the lever 55 into its operative position causes the follower 65 to overcome the spring 71 (see FIGS. 4 and 10) thereby pulling the carrier 53 in a radial direction relative to the cutter 25 and sliding the key blank along the block for the bite 20 to be cut in the key tube 19. As shown in FIG. 10, the radial depth of the bite cut in the key tube is limited to a desired depth by engagement of an axial extension 73 of one of the guide rods 40 with the second stop means 26.

Advantageously to aid in inserting key blanks 16 in the chuck 21 and in avoiding interference with other parts of the key cutting machine 15, a blocking arm 74 (see FIGS. 1 and 7) is attached to the forward side of the chuck housing 31 for movement into a position to prevent the chuck from sliding forwardly on the guide rods 40. Preferably, the blocking arm fits between one of the forward guide rod bosses 57 and the chuck housing as is shown in FIG. 1. By virtue of this arrangement, the lever 55 may be swung counterclockwise from its inoperative position to pull the carrier 53 along the ways 54, thereby moving the chuck into a position past the cutter for easy access in removing keys from and inserting them into the chuck.

In accordance with the primary object of the present invention, a unique decoder 75 enables the exemplary key cutting machine 15 to be used to produce key copies from a sample key 16' whose code is deciphered while making the copy. For this purpose, the decoder is secured to the base 32 of the machine and forms an integral part of the machine to function in conjunction with the cam disk 45 of the first stop mechanism 24. The decoder is used to measure the axial length of a bite in the sample and cooperates with the cam disk 45 to position the disk at a code setting corresponding to the axial length of the bite being used. In this way, the block 41 is positioned axially for the same axial length of bite to be cut in the key blank 16 carried by the chuck 21.

In the present instance, the decoder 75 (see FIGS. 1 and 6) comprises a support member 76 secured to the base 23 adjacent the first stop mechanism 24. Mounted within the support horizontally of the code disk 45 are gage means 78 for measuring the axial length of a bite in the sample key 16'. Herein, the gage means comprises a generally cylindrical plunger 77 extending through the upper end portion of the support so that an inner end 79 of the plunger protrudes from one side of the support and is aligned horizontally with the disk for engagement with the edge of the disk. On the other side of the support, an outer end 80 of the plunger is sized to telescope into the tube end of the sample key 16' and a tooth 81 extends downwardly from a rearwardly extending projection 83 of a cap plate 84 on the upper end of the support so as to fit within the bite being measured on the sample key (see also FIG. 11). when measuring, the sample key is positioned precisely on the outer end portion 80 of the plunger 77 and the plunger is pushed toward the cam disk 45 from a zero setting until the tooth 81 engages the end wall of the bite 20' being measured. Accordingly, the distance that the inner end 79 of the plunger is moved toward the disk corresponds to the axial length of the bite being measured.

As shown in FIGS. 6, 11 and 12, precise positioning of the sample key 16' on the outer end portion 80 of the plunger 77 is achieved by telescoping the key onto the plunger with an internal locating rib 85 (see FIGS. 11 and 12) of the key sliding into a mating groove 86 formed in such outer end portion. When the end wall of the rib abuts the end wall of the groove, the key is located in a precise axial position relative to the plunger, the end surface of the key being aligned with the outside face of the tooth at a zero setting of the plunger. Advantageously, the groove is located in an angular index position on the plunger corresponding to one of the index numbers 39 located on the chunk collar 36 and an index wheel 87 secured to the plunger 77 is appropriately numbered to correspond with the index numbers on the collar so that the angular positions of the sample key 16' and the key 16 to be cut may be set to correspond with each other. An aperture 89 formed through the cap plate projection 83 enables the operator of the machine to visually check the angular setting of the plunger to see if the two keys are properly positioned angularly. Thus, it is seen that through the use of the groove 86 and the internal rib 85, the sample key is located precisely on the outer end of the plunger both axially and angularly.

To measure the axial length of the bite 20 in the sample key 16' once the latter is located on the plunger 77, the plunger simply is pushed toward the cam disk 45 until the outside face of the tooth 81 abuts the end wall of the bite. A knob 90 (see FIG. 6) is adapted to be threaded downwardly through the cap plate 84 and the upper end of the support 76 to raise and lower the tooth 81 and hold it in a preselected place. Currently, there are three diameter sizes of tubular keys, each with its own radial bite dimension (which differ from one another). By turning the "knob 90," the probe (tooth 81) can be set to the proper height, namely, to abut the end wall of the radial bite. In this manner, an accurate bite reading is achieved regardless of the key diameter. The plunger is retracted by a spring 91 acting within a chamber in the support between an annular flange 93 fixed to the plunger so that the support urges the plunger back toward its zero setting.

To cooperate with the plunger 77 in locating the block 41 at the position desired for cutting the key blank 16, the cam disk 45 is constructed in a particularly unique fashion with diametrical points on the disk edge being spaced radially to each other. Herein, such radial distances proportional to each other. Herein, radially measured distances are proportional to each other on a one-to-one basis, that is, the radially measured distance from the center of the disk to one edge is the same as the radially measured distance to a diametrical point on the opposite edge. Accordingly, the opposite halves of the disk appear as inverted, mirror images of each other. By virtue of this arrangement, to set the block 41 in the position corresponding to the axial length of the bite being measured by the plunger, the disk 45 is turned with its shaft 42 until the cam edge of the disk adjacent the inner end 79 of the plunger engages such inner end. Because the radial distance from the center of the disk to the plunger is equal to the radial distance to a diametrical point on the opposite edge of the disk regardless of the setting of the disk, the block is moved in an axial direction relative to the cutter as the disk is turned. In this way, the block is positioned appropriately for the particular bite being measured on the sample key thereby enabling the key blank to be cut simply by pushing the lever 55 counterclockwise as previously described.

Advantageously, the markings 49 on the cam disk 45 enable the operator of the exemplary machine 15 to make a coded record of the sample key 16' for future reference so that other copies of the sample may be made without using the decoder 75. Moreover, the markings on the opposite halves of the disk may be made to correspond to different codes so that one disk may be used for two different code systems. Alternatively, it is also possible to use a single disk with one set of markings. Cutting keys by code, even though the various lock manufacturers may use different key bite increments, is possible by simply using a comparative chart which would translate a disk reading to a manufacturer's code number.

Thus, it is seen from the foregoing that the present invention brings to the art a new and improved tubular key making machine 15 particularly adapted for use in reproducing keys 16 from a sample key 16' whose code is deciphered at the same time that the new key is being made. To this end, the machine includes a novel decoder 75 operable in conjunction with the uniquely constructed cam disk 45 to set the first stop mechanism 24 in the position desired. Once the mechanism is positioned, the novel lever mechanism 51 enables the new key to be cut quickly and easily with a single stroke of the lever 55.

I claim:

1. A machine for making tubular keys, comprising, in combination, a base, key cutter means connected on said base for cutting a bite in a key, key-carrying chuck means mounted on said base for movement in axial and radial directions relative to said cutter for the latter to cut a bite in the key to a preselected axial length and radial depth, a first stop for locating the key axially relative to said cutter to determine said preselected length of bite, a second stop for locating the key radially relative to said cutter to determine said preselected depth of bite, means including a lever mechanism pivotally connected with one of said chuck means and said cutter means and being operable with a single stroke thereof to move said chuck means relative to said cutter means in both said axial and radial directions for the key to engage with said cutter so a bite may be cut in the key to said preselected axial length and radial depth, said lever mechanism means having yieldable holding means directing solely axial relative movement between said chuck means and said cutter means upon rotation of the lever until restrained by said first stop and thereafter yielding by said holding means causes radial movement between said chuck means and said cutter means until engagement of said second stop upon continued rotation of the lever.

2. A machine as defined by claim 1 for making duplicate tubular keys from a sample, and a decoder mounted on said base and being operable in conjunction with the sample to engage said first stop means to set the latter in a selected position so the axial length of bite cut in said key is the same as the length of the bite in said sample.

3. A machine as defined in claim 2 wherein said decoder includes gage means mounted on said base for measuring the axial length of the bite in the sample key and for setting said first stop means in selected position.

4. A machine as defined by claim 3 wherein said decoder further includes a cam disk supported on said base adjacent said gage means for engagement thereby, said disk having a first cam edge engaging said stop means and a second cam edge shaped generally as an inverted mirror image of said first edge, said disk being mounted rotatably on said base for turning to position said second edge in engagement with said gage means whereby said first edge locates said first stop means at a setting corresponding to the axial length of the bite being measured on said sample.

5. A machine as defined by claim 10 wherein said gage means includes a support secured to said base, a plunger slidably mounted on said support for movement in a generally axial direction toward and away from said first stop means between inner and outer positions, said plunger having an outer end portion for telescopically receiving said sample key, an opposite inner end and a tooth fixed to said support and projecting toward said plunger to extend into the bite on said sample and engage with the end of said bite to limit the distance moved by said plunger into its inner position to equal to axial length of said bite so as to thereby locate the inner end of said plunger for engagement by said second edge of said disk whereby said first edge locates said first stop means in its located position.

6. A machine as defined by claim 5 wherein said plunger is rotatable about its axis for indexing between selected angular positions.

7. A machine as claimed in claim 1 for making a duplicate tubular key from a sample including, means mounted on said base for measuring the axial length of a bite in the sample and being movable from a retracted position into an extended position corresponding to the axial length of the bite being measured, and said first stop means mounted on said base and being adjustable between selected settings for positioning of the blank axially relative to said cutter, said measuring means engaging said first stop means at one of said settings to limit the axial length of the bite to be cut in said blank to be equal to the axial length of the bite being measured on the sample.

8. A machine as claimed in claim 3 for making a duplicate tubular key from a sample including, means mounted on said base for measuring the axial length of a bite in the sample and being movable from a retracted position into an extended position corresponding to the axial length of the bite being measured, a disk supported on said base for movement between selected settings and having first and second halves shaped generally as inverted mirror images of each other, first and second cam surfaces defined by said first and second halves, respectively, and the first stop being a movable stop engageable by the blank to locate the latter axially relative to said cutter, said first stop normally being urged into engagement with said first cam surface so as to be positioned thereby, said disk being rotatable on said base for moving said second cam surface into engagement with said measuring means so as to select the disk setting corresponding to the length of bite being measured on the sample.

9. A machine for making tubular keys, comprising, a base, a key cutter mounted on said base for cutting a bite in a key, a carrier mounted on said base to slide in a generally radial direction relative to said cutter, a key-carrying chuck slidably mounted on said carrier for forward movement in a generally axial direction relative to said cutter, a first stop for locating said key axially in a preselected position relative to said cutter for cutting a bite of selected axial length in the key, a second stop for locating the key radially in a preselected position relative to said cutter for cutting a bite of selected radial depth in the key, a lever pivotally mounted on said base for movement between an inoperative position and an operative position, yieldable holding means connecting said lever with said chuck so that movement of the lever from the inoperative position toward the operative position moves said chuck normally first in a generally forward direction toward said first stop until the key engages said first stop and thereafter continued movement of said lever toward the operative position moves said carrier and said chuck together in said radial direction until said second stop is engaged so said cutter cuts a bite in said key to said preselected axial length and radial depth, and both said forward axial and radial movements occur sequentially as an incident to a single pivoting of said lever from its inoperative position into its operative position.

10. A machine as defined by claim 9 wherein said yieldable connecting means comprises a follower connected between said lever and said chuck, a guide way formed on one of said lever and said chuck to receive said follower and a spring acting against said follower and between said one of said lever and chuck to hold the latter yieldably against substantial movement relative to said follower so said chuck is moved generally in said forward direction while said lever initially is being pivoted toward its operative position, said spring yielding as said key engages said first stop and thereby is blocked against further movement in said forward direction so that continued movement of said lever toward its operative position moves said carrier and said chuck in said radial direction for said bite to be cut in said key.

11. A machine as defined by claim 10 wherein said guide way comprises an elongated slot formed in said carrier and extending diagonally relative to said radial and axial directions, said follower being telescoped into said slot.

12. A machine as defined by claim 11 including an arm pivotally mounted on said chuck and engaging said follower, said spring being connected between said arm and said chuck and urging said arm against said follower to hold said follower normally against substantial movement relative to said chuck so the latter moves with said follower as said lever is pivoted on said base.

13. A machine for making tubular keys, conprising, in combination, a base, key cutter means mounted on said base for cutting a bite in a key, key-carrying chuck means mounted on said base for movement in axial and radial directions relative to said cutter for the latter to cut a bite in the key to a preselected axial length and radial depth, a first stop for locating the key axially relative to said cutter to determine said preselcted length of bite, a second stop for locating the key radially relative to said cutter to determine said preselected depth of bite, a lever pivotally mounted on said base for movement between an inoperative position and an operative position, means connecting said lever with one of said chuck means and said cutter means for moving said chuck means normally first in a forward direction generally toward said first stop and thereafter in a substantially radial direction relative to said cutter as said lever is pivoted from its inoperative position into its operative position, said connecting means comprising a follower connected between said lever and said one of said chuck means and said cutter means, a guide way formed on one of said lever and said one of said chuck and cutter means and receiving said follower, a spring acting between said lever and said one of said chuck and cutter means and yieldably holding the latter for bodily movement with said lever normally in said forward direction as said lever is pivoted toward its operative position, said spring yielding as said first stop blocks said one of said chuck and cutter means against further forward movement so that, with continued movement of said lever toward its operative position, said one of said chuck and cutter means moves only in said radial direction for said bite to be cut in said key.

14. A machine for making tubular keys, conprising, a base, a key cutter mounted on said base for cutting a bite in a key, a carrier mounted on said base to slide in a generally radial direction relative to said cutter, a key-carrying chuck slidably mounted on said carrier for movement in a generally axial direction relative to said cutter, a first stop for locating the key axially in a preselected position relative to said cutter for cutting a bite of selected axial length in the key, a second stop for locating the key radially in a preselected position relative to said cutter for cutting a bite of selected radial depth in the key, a lever pivotally mounted on said base for movement between an inoperative position and an operative position, a follower journaled on said lever, a slot formed in said carrier and extending diagonally relative to said radial and axial directions, said follower being telescoped into said slot, an arm pivotally mounted on said chuck and engaging said follower, and a spring connected between said arm and said chuck and urging said arm against said follower to hold said chuck normally against said arm follower to move therewith upon movement of said follower within said slot as said lever is pivoted on said base, said spring yielding as said first stop means blocks said chuck against further movement in said axial direction whereby continued movement of said lever toward its operative position moves said carrier and said chuck in said radial direction for said bite to be cut in said key.

15. A machine for making a duplicate tubular key from a sample including, a base, a cutter mounted on said base for cutting bites in a blank to form the duplicate key, a chuck for carrying the blank mounted on said base for movement in radial and axial directions relative to said cutter, means mounted on said base for measuring the axial length of a bite in the sample and being movable from a retracted position into an extended position corresponding to the axial length of the bite being measured, a disk supported on said base for movement between selected settings and having first and second halves shaped generally as inverted mirror images of each other, first and second cam surfaces defined by said first and second halves, respectively, a first adjustable stop engageable by the blank to locate the latter axially relative to said cutter, said first stop normally being urged into engagement with said first cam surface so as to be positioned thereby, said disk being rotatable on said base for moving said second cam surface into engagement with said measuring means so as to select the disk setting corresponding to the length of bite being measured on the sample, a second adjustable stop for locating said key radially relative to said cutter to determine a preselected radial depth of the bite to be cut in said blank, and a lever mechanism connected with one of said chuck and said cutter and being operable with a single stroke thereof to move said chuck relative to said cutter sequentially axial and radial directions so said blank is positioned by said first and second stops to engage with said cutter for said bite to be cut in said blank to said preselected axial length and radial depth.

* * * * *